F. L. EIDMANN.
COUPLING DEVICE FOR TRUCKS.
APPLICATION FILED OCT. 23, 1920.
1,382,896.  Patented June 28, 1921.
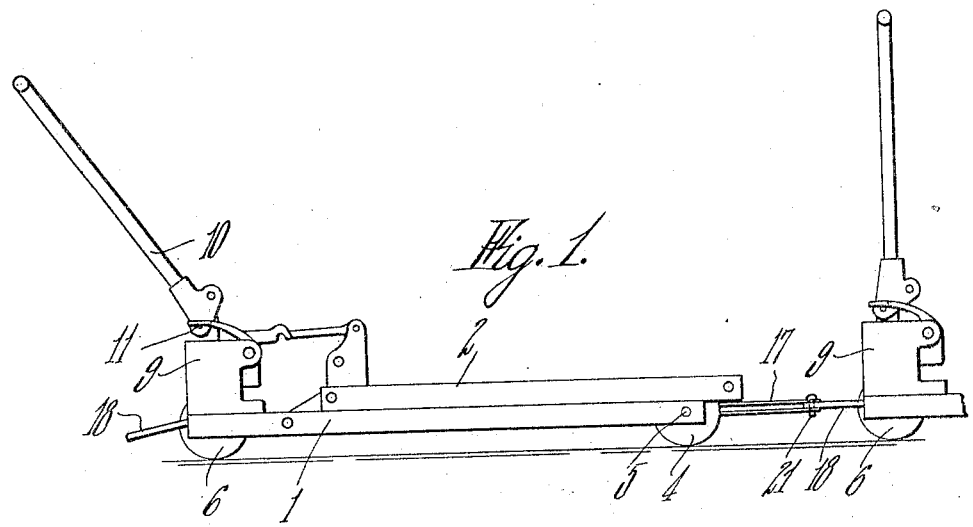
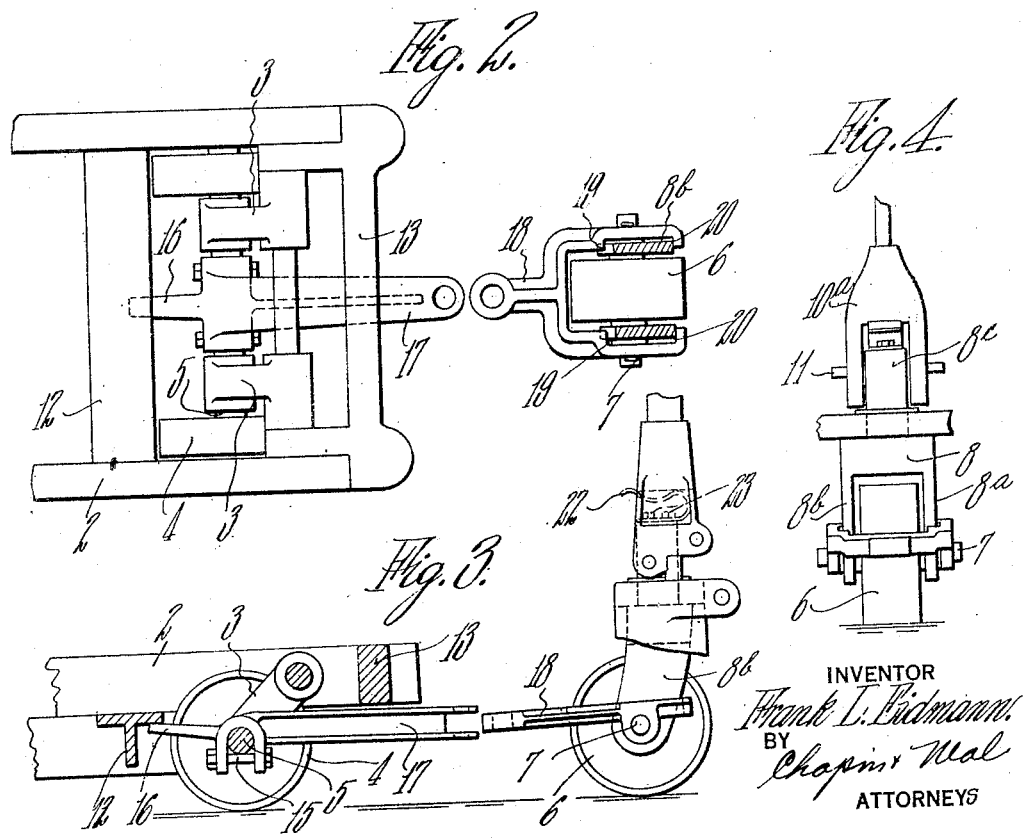
INVENTOR
Frank L. Eidmann
BY
Chapin + Neal
ATTORNEYS

UNITED STATES PATENT OFFICE.

FRANK L. EIDMANN, OF HOLYOKE, MASSACHUSETTS, ASSIGNOR TO EDWARD N. WHITE, J. LEWIS WYCKOFF, AND GEORGE F. JENKS, ALL OF HOLYOKE, MASSACHUSETTS, TRUSTEES, DOING BUSINESS AS COWAN TRUCK COMPANY.

COUPLING DEVICE FOR TRUCKS.

1,382,896.   Specification of Letters Patent.   Patented June 28, 1921.

Application filed October 23, 1920. Serial No. 418,875.

*To all whom it may concern:*

Be it known that I, FRANK L. EIDMANN, citizen of the United States, residing at Holyoke, in the county of Hampden and State of Massachusetts, have invented new and useful Improvements in Coupling Devices for Trucks, of which the following is a specification.

This invention relates to a coupling device for connecting hand-trucks, and is particularly adapted for use in trailing one or more hand-trucks of the type shown in Patent Reissue No. 14575, reissued Dec. 24, 1918, behind a tractor.

Among the several objects of the invention, is to provide a simple, durable, sturdy and easily detachable coupling means between trucks of this character, whereby a line of trucks may be hauled about by a tractor in various directions, and to provide connections so that said trucks will easily track one behind the other.

A further object is to provide a device which is compact in arrangement and will not unduly lengthen the distance between connected trucks. For this purpose, means are also provided to hold the steering handle of the connected trucks in an upright position.

Further objects of the invention will become apparent from the following specification, and the preferred embodiment of the invention is shown in the accompanying drawings, in which—

Figure 1 is a side elevation of a truck and the front end of a trailing truck, embodying the present invention;

Fig. 2 is a plan view of the separate members of the devices attached to the axles of each truck, showing portions of the truck in sections;

Fig. 3 is a side elevation of the parts shown in Fig. 2, and in addition a side elevation of the means to hold the steering handle in upright position; and Fig. 4 is a front view of the means to hold the steering handle in an upright position.

I have shown for purposes of illustration trucks of the elevating-platform type comprising a lower frame 1, upper frame 2 mounted on links 3, the lower frame being supported on wheels 4 at the rear carried on rear axle 5, and front steering wheel 6 carried on front axle 7 in wheel-fork 8. The wheel-fork 8 comprises the side members 8ª and 8ᵇ and a post 8ᶜ swivelly mounted in the head 9 of the frame 1. A steering and draft handle 10 is pivoted at 11 to the wheel-fork post 8ᶜ for up-and-down movement, and is swingable laterally for steering the truck. The rear end of the lower frame 1 is braced by a cross-bar 12, and the rear end of the upper frame 2 is connected by cross-bar 13. The further details of the trucks need not be described as they constitute no part of the present invention.

The coupling device for connecting two trucks of the above general character will now be described. 14 is the pulling member adapted for being loosely mounted on the rear axle 5 of a truck and held thereon by bolts 15, 15, and consisting of a forward extension or lug 16 which engages the under side of a cross-bar 12 on the frame 1 and a rear extension 17 having preferably a bifurcated construction with centered holes at its ends. The rear extension 17 is made heavier than the forward extension so that the pull member is held by its weight substantially in a horizontal position by engagement of the forward extension 16, as described.

18 is the drawn member consisting of a forked portion pivotally mounted on the front axle 7 of the trailing truck and having its forked ends each provided with front and rear shoulders 19 and 20 adapted to engage the front and rear edges of the steering wheel fork members 8ª and 8ᵇ, as shown, thereby holding said member 18 in substantially a horizontal position. The front end of this member 18 is preferably made in the form of a ring which fits into the bifurcated end of the pull member 17 and is connected to same by a coupling-pin 21. If desired for any reason, the construction of the connected ends may be reversed.

It is preferable to provide a short connection between the trucks, as by the coupling-device described, and therefore it is desirable to hold the steering and draft handle of the trailing truck securely in an out of the way position, preferably in a vertical position. For this purpose, a spring-latch 22 is provided, fastened by bolts 23 to the top of the steering fork post 8ᶜ and in position to engage a part of the steering handle, as shown in Figs. 3 and 4. The spring-latch 22 is preferably in the form of a bowed spring with its free end curved to cam under and engage the bifurcated portion 10ª of the handle. Its construction is such that the handle will be firmly held in vertical position thereby, and may be freely engaged and disengaged therefrom when desired.

It is to be understood that various changes and modifications of the construction shown and described may be made within the scope of the invention as claimed.

What I claim is:

1. The combination with a pair of handtrucks each comprising a wheel-supported frame having a rear axle and a front axle mounted in a steering-wheel carrier, of a coupling device for said trucks comprising, a pull member detachably connected to the rear axle of one truck and having a forward extension and rear heavier extension whereby the said forward extension will engage beneath a portion of the frame of said truck normally holding said member in a horizontal position, a draw member detachably connected to the front axle of the other truck and having shoulders for engaging opposite sides of said steering-wheel carrier to normally hold the same in substantially horizontal position, said members being detachably and pivotally connected to one another.

2. The combination with a pair of handtrucks each comprising a rear axle and a front axle mounted in a steering-wheel carrier, of a coupling device for said trucks comprising, a pull member having a portion of the same adapted to be pivotally mounted and held on said rear axle of one truck and a draw member having a portion adapted to be pivotally mounted on said front axle of the other truck, said members being detachably and pivotally connected to one another, both members being provided with means to normally hold the same in a substantially horizontal position when disconnected from one another.

3. The combination with a pair of hand trucks, each comprising a wheel-supported frame having a rear axle and a front axle mounted in a steering wheel carrier, of a coupling device for said trucks comprising a pull member having a portion mounted on said rear axle of one truck for pivotal movement on a horizontal axis and an extension of said member for engaging a portion of the frame of said truck to limit the pivotal movement of said pull member, a draw member having a portion mounted on said front axle of the other truck for a pivotal movement on a horizontal axis, and an extension for engaging the steering wheel carrier to limit the pivotal movement of said draw member, said members being detachably and pivotally connected to one another for relative movement about a vertical axis.

In testimony whereof I have affixed my signature.

FRANK L. EIDMANN.